(12) United States Patent
Marshall (10) Patent No.: US 6,552,724 B1
(45) Date of Patent: Apr. 22, 2003

(54) TRIANGLE STRIP MERGING FOR LENGTH MAXIMIZATION

(76) Inventor: Carl S. Marshall, 15451 NW. Andalusian Way, Portland, OR (US) 97229

( * ) Notice: Subject to any disclaimer, the term of this patent is extended or adjusted under 35 U.S.C. 154(b) by 0 days.

(21) Appl. No.: 09/306,359

(22) Filed: May 6, 1999

(51) Int. Cl.$^7$ .............................. G06T 17/00
(52) U.S. Cl. ................................... 345/420
(58) Field of Search ............... 345/420, 419, 345/440, 423, 426, 441

(56) References Cited

U.S. PATENT DOCUMENTS

| | | | | |
|---|---|---|---|---|
| 5,448,687 A | * | 9/1995 | Hoogerhyde et al. | 345/423 |
| 5,862,252 A | * | 1/1999 | Yamamoto et al. | 345/419 |
| 5,945,996 A | * | 8/1999 | Migdal et al. | 345/420 |
| 5,982,385 A | * | 11/1999 | Fish et al. | 345/441 |
| 6,137,492 A | * | 10/2000 | Hoppe | 345/420 |
| 6,208,347 B1 | * | 3/2001 | Migdal et al. | 345/419 |

* cited by examiner

*Primary Examiner*—Mark Zimmerman
*Assistant Examiner*—Hue Dung X Cao (57) ABSTRACT

Triangle strip merging for length maximization of triangle strips representing a triangle mesh. In one embodiment, a computer-implemented method, for each strip, first including determining whether a defining face of the strip has a neighboring face that is a defining face of another strip. A defining face of a particular strip is either a front face, an end face, or an orphan face of the particular strip. Upon determining that a defining face of the strip has a neighboring face that is a defining face of another strip, then the two strips are joined to create a new, larger strip if they are joinable.

15 Claims, 7 Drawing Sheets

TRIANGLE STRIP MERGING FOR LENGTH MAXIMIZATION

FIELD OF THE INVENTION

This invention relates generally to three-dimensional (3D) models represented as triangle meshes, and more particularly to representing a triangle mesh as a series of triangle strips.

BACKGROUND OF THE INVENTION

As computers become increasingly more powerful, they have been increasingly used to run computer programs that utilize three-dimensional (3D) models, or objects. Such programs include game programs where a game player views his or her surroundings in three dimensions, computer-aided-drafting (CAD) programs allowing architects, engineers and designers to construct plans for real-world objects in three dimensions, as well as other programs. The three-dimensional objects used by these and other computer programs have generally become increasingly complex.

One manner by which three-dimensional models are represented within a computer is known as a triangle mesh. A triangle mesh includes a number of differently sized triangles, such that at least one edge of each triangle within the mesh is shared with another triangle, and each vertex of each triangle within the mesh is shared with at least one another triangle. Complex three-dimensional objects can be constructed utilizing triangle meshes. For example, small numbers of triangles can be used for flat surfaces of an object, while large numbers can be used to mold curved surfaces of the object, similar to the way a geodesic dome is constructed.

As triangle meshes have gained popularity to represent three-dimensional models within computers, and as these triangle meshes have become more complex to represent increasingly complex three-dimensional models, the issue of representing a triangle mesh in a sequential manner has become important. A triangle mesh is generally a non-sequential representation: it usually does not have a set beginning nor a set end. Representing the triangle mesh sequentially, however, is important to save the triangle mesh to a sequential file for storage on a storage device such as a hard disk drive, for instance, or for sending to another computer over a network such as the Internet, for example.

One manner by which triangle meshes are represented in a sequential manner is through the use of triangle strips. A triangle strip defines a connected group of triangles in a sequential fashion, having a set beginning and a set end. In one representation of a triangle strip, the strip is represented as a series of vertices. A new triangle is typically defined for each vertex added to the strip after the first two vertices. In this particular representation, N-2 triangles are defined, where N is the number of vertices in the representation.

Once triangle strips are selected as a desired manner by which to represent triangle meshes in a sequential manner, an important issue becomes the manner in which a triangle mesh is converted to a series of one or more triangle strips. The series of triangle strips must as a whole represent all of the plurality of triangles within the mesh. For a compact representation, desirably no triangles within the mesh are repeated within the triangle strips—that is, each single triangle within the mesh is represented only once within the triangle strips. Furthermore, longer triangle strips are generally better, because they usually lend themselves to easier storage and transmission as a file. In addition, the generation of longer triangle strips generally means that less strips are necessary to represent a particular triangle mesh. For these and other reasons, there is a need for the present invention.

SUMMARY OF THE INVENTION

Embodiments of the present invention relate to triangle strip merging for length maximization of a plurality of triangle strips representing a triangle mesh. In one embodiment, a computer-implemented method, for each triangle strip, first includes determining whether a defining face of the strip has a neighboring face that is a defining face of another strip. A defining face of a particular strip is either a front face, an end face, or an orphan face of the particular strip. Upon determining that a defining face of the strip has a neighboring face that is a defining face of another strip, it is determined whether the strip and the another strip are joinable. If they are joinable, then the two strips are joined to create a new, larger strip in place of the strip and the another strip.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
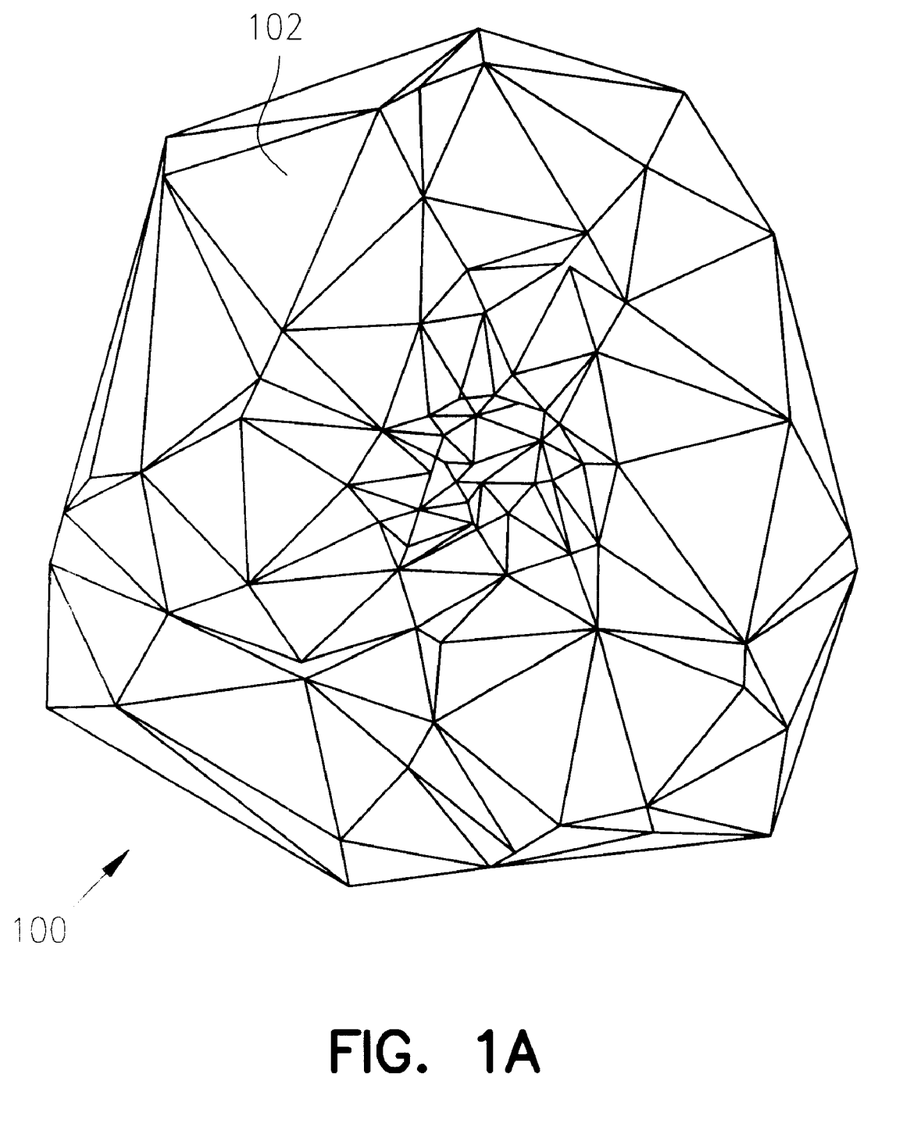
FIGS. 1(a)–1(c) show diagrams of representative examples of triangle meshes that can be utilized in conjunction with embodiments of the invention.
Figure 1B:
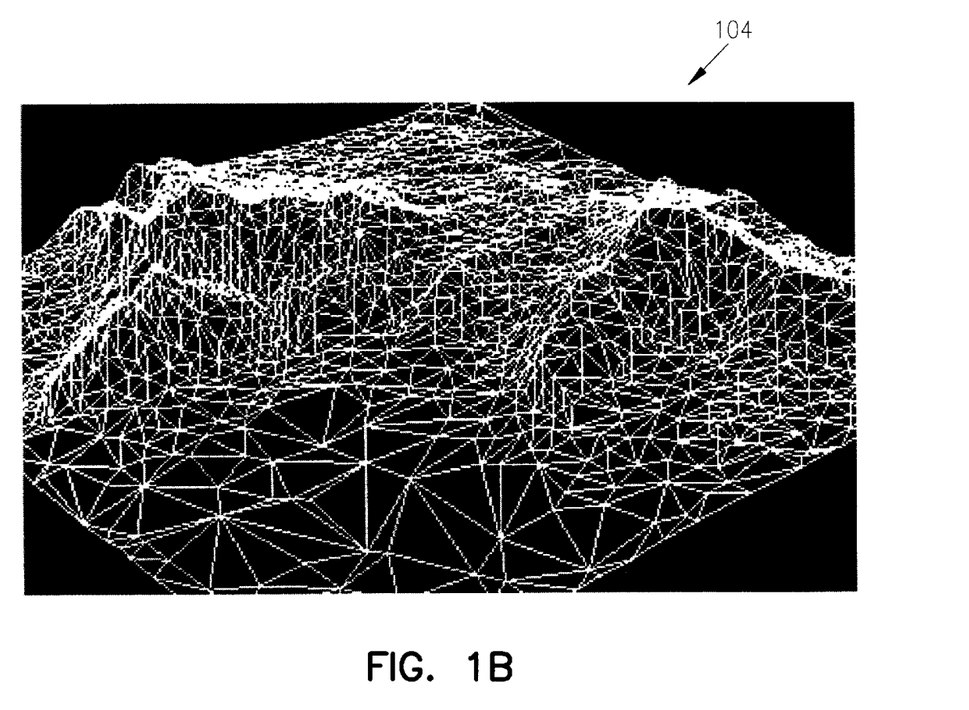
Figure 1C:
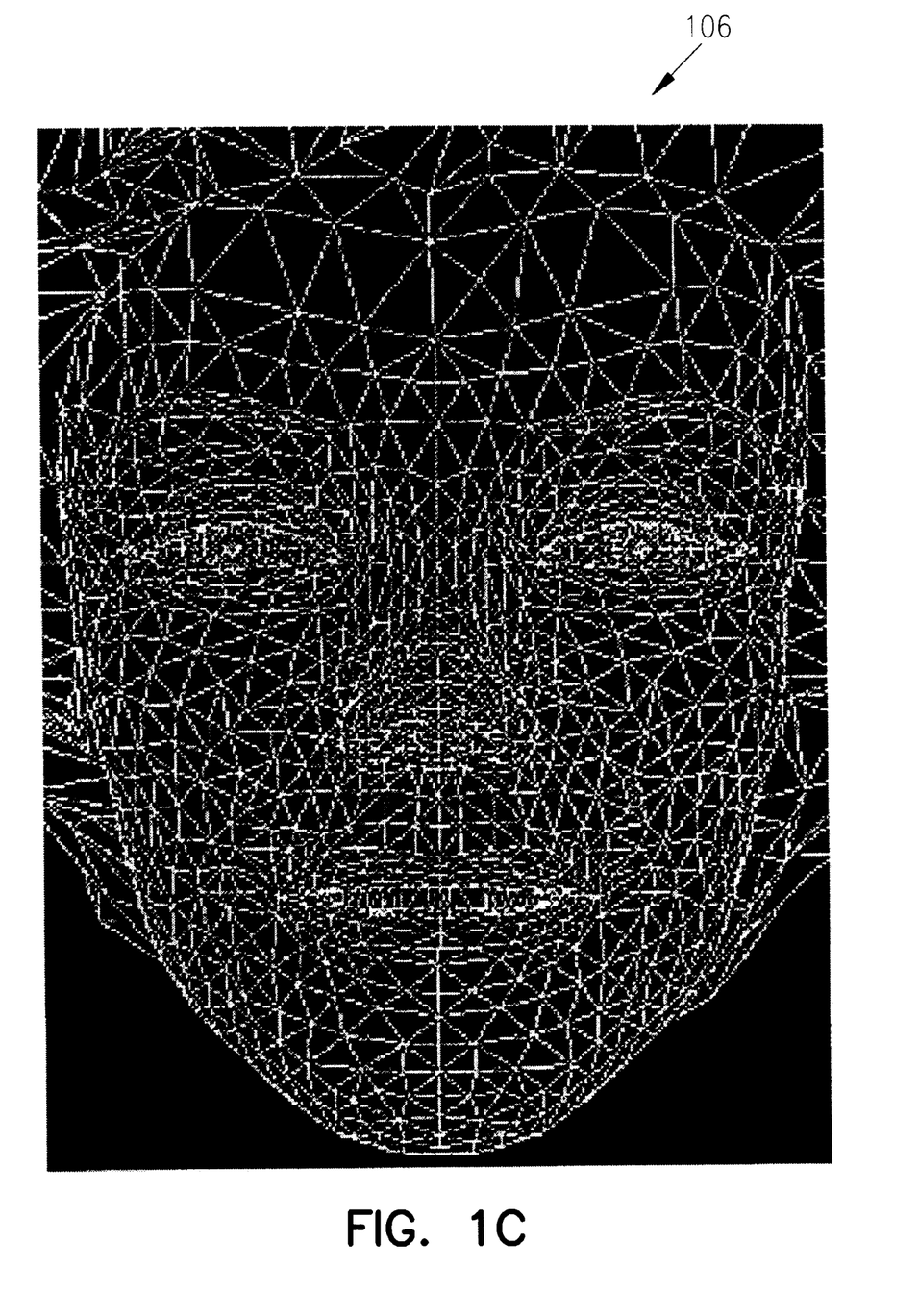

At least some embodiments of the invention can be used to represent a triangle mesh as a series of triangle strips. A representative example of a triangle mesh is shown in FIG. 1(a), which includes a triangle mesh 100 having a plurality of triangles, such as the triangle 102. The triangle mesh 100 itself represents a three-dimensional object. Those of ordinary skill within the art can appreciate that the invention is not limited to a given complexity of a triangle mesh that can be represented as a series of triangle strips. Other representative examples of triangle meshes include a triangle mesh 104 of FIG. 1(b), which represents a three-dimensional terrain, and a triangle mesh 106 of FIG. 1(c), which represents a three-dimensional representation of a human face.

Figure 2A:
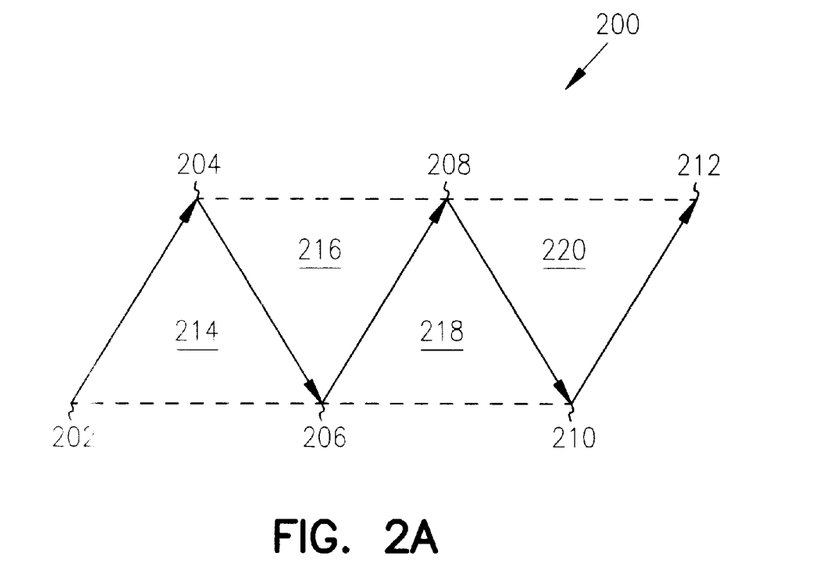
FIG. 2(a) shows a diagram of a representative example of a triangle strip that can be utilized and/or generated in conjunction with embodiments of the invention.

A representative example of a triangle strip that can be utilized and/or generated by at least some embodiments of the invention is shown in FIG. 2(a). The triangle strip 200 is represented as a series of vertices 202, 204, 206, 208, 210 and 212, which define the triangles of the strip 200, triangles 214, 216, 218 and 220. Triangle 214, for example, is defined as the first three vertices 202, 204 and 206. Triangle 216 is defined as the three vertices beginning with vertex 204, vertices 204, 206 and 208. Triangle 218 is defined as the three vertices beginning with the vertex 206, vertices 206, 208 and 210. Triangle 220 is defined as the three vertices beginning with the vertex 208, vertices 208, 210 and 212. Thus, for the N=6 vertices of the triangle strip 200, N-2=4 triangles are defined.

Those of ordinary skill within the art can appreciate, however, that this relationship of N-2 triangles being defined for N vertices does not necessarily always hold. For example, in triangle 200 each successive triangle is defined by a beginning edge equal to the leading edge of the previous triangle: triangle 216, for instance, begins with the edge defined by vertices 204 and 206, which is the leading edge of the triangle 214. In the situation where a successive triangle is defined by a beginning edge equal to an edge of the previous triangle that is not the leading edge of the previous triangle, a vertex may have to be repeated within the representation of the triangle strip, such that the relationship of N-2 triangles being defined for N vertices does not hold.

To aid in the description of different embodiments of the invention, several terms are used that are now defined. A face of a triangle strip or of a triangle mesh is a triangle of the strip or the mesh. A neighboring face to a particular face is a face that shares a common edge with the particular face within a mesh: because the particular face has three edges (since it is a triangle), the particular face can have anywhere from zero to infinity neighboring faces. A defining face of a triangle strip is a front (or, start or first) face of the strip, an end (or, last) face of the strip, or an orphan face of the strip. When a strip has at least two faces, it has a front face and an end face. When a strip has only one face, it only has an orphan face. A defining edge of a defining face is: the starting (first) edge of the defining face in the case where the defining face is a front face; the ending (last) edge of the defining face in the case where the defining face is an end face; and, an orphan edge of the defining face in the case where the defining face is an orphan face, which is an edge of the orphan face. Furthermore, two triangle strips are said to be joined when they are merged together to create a new, longer triangle strip in place of the two triangle strips.

Figure 2B:
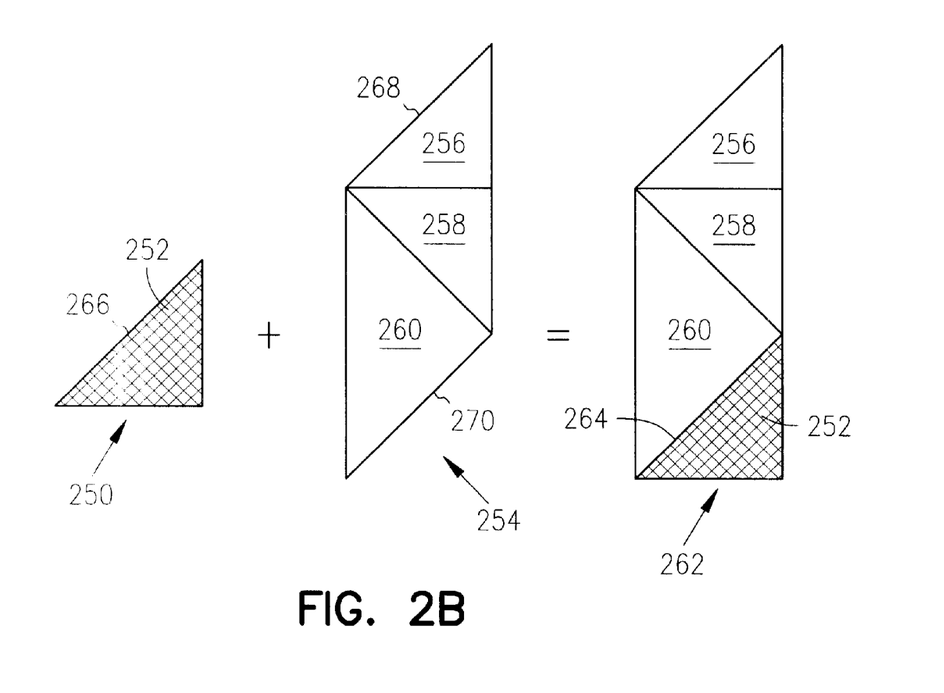
FIG. 2(b) shows a diagram of a first triangle strip and a second triangle strip that are merged to yield a new, larger triangle strip, as can be accomplished by various embodiments of the invention.

Illustration of these terms is shown in FIG. 2(b), which is a diagram of a first triangle strip and a second triangle strip that are merged to yield a new, larger triangle strip, as can be accomplished by various embodiments of the invention. The triangle strip 250 has a single triangle (or face) 252, which is shaded to distinguish it from the faces of the triangle strip 254. The triangle strip 254 has three triangles (or faces) 256, 258 and 260. The strips 250 and 254 are merged together to create a new, longer triangle strip 256, which has triangles (or faces) 256, 258 and 260 from the strip 254, and triangle 252 from the strip 250.

Within the strip 262, face 260 and face 252 are neighboring faces to one another, because they both share a common edge 264. The face 252 of the strip 250 is a defining face of the strip 250, and more particularly is an orphan face. The face 256 of the strip 254 is a defining face of the strip 254, and more particularly is a front face of the strip 254. The face 260 of the strip 254 is a defining face of the strip 254, and more particularly is an end face of the strip 254. Face 258 of the strip 254 is not a defining face of the strip 254. The defining edge; of the face 252 of the strip 250 is the edge 266 of the face 252 (or, any edge), and is an orphan edge. The defining edge of the face 256 of the strip 254 is the edge 268 of the face 256, and is a start edge. The ending edge of the face 260 of the strip 254 is the edge 270 of the face 260, and is an ending edge. It is noted that, because the strips 250 and 254 can be joined to create the strip 264, the defining edge 266 of the face 252 of the strip 250 is identical to the defining edge 270 of the face 260 of the strip 254, and both are identical to edge 264 of the faces 260 and 252 of the strip 262.

Figure 3A:
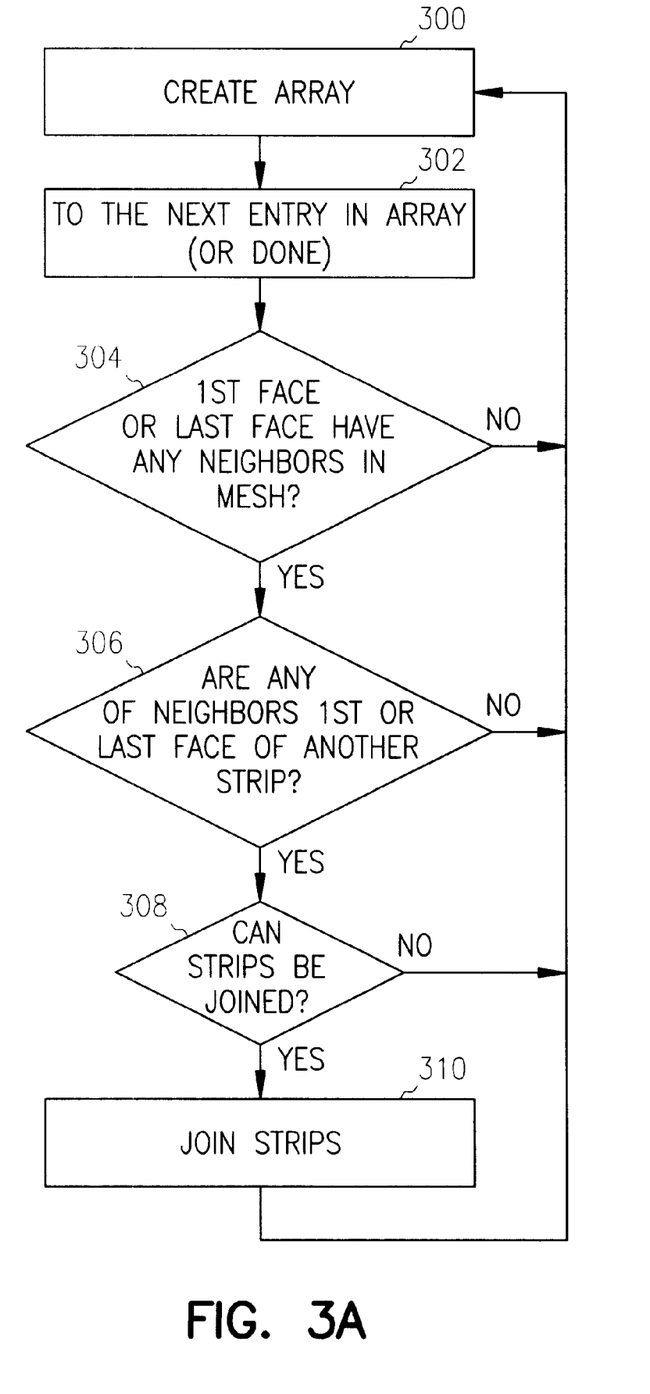
FIG. 3(a) shows a flowchart of a computer-implemented method according to an embodiment of the invention.

A computer-implemented method according to an embodiment of the invention is now shown in FIG. 3(a). This embodiment of the invention attempts to merge two or more triangle strips of a plurality of triangle strips to maximize the length of the plurality of triangle strips that represent a triangle mesh. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 300, an array is generated, which can have a size equal to the number of faces in the mesh. The array in one embodiment has a number of entries equal to the number of faces of a plurality of triangle strips representing a triangle mesh of a three-dimensional (3D) object or model. There is an entry for each defining face of each triangle strip. In one embodiment, each entry includes at least the following fields: a pointer pointing to the face of the defining face corresponding to the entry; a defining face edge type: either a front face edge, an end face edge, or an orphan face edge; and, an index of neighboring faces for the defining face corresponding to the entry, include each neighboring face to the defining face within the mesh.

In another embodiment, pseudo-code for the structure of the entries can be written as:

```
struct ITSNODE {
    struct ITSSTRIP *tstrip;      // Tri-strip data structure
    int nfaces[3];                // Neighboring faces
    EdgeType edgetype;            // Start, Ending, Orphan Edge
    int invalid;                  // Has this node been previously used
    int smoothID, matID;          // Smoothing Group and Material used
    unsigned long faceIndex;      // Face Index into the Face Pool
    struct ITSNODE *next;         // Next Node in this list
};
```

The pointer *tstrip points to the data structure representing the triangle strip of which the defining face is a part. Each nface[i] points to a neighboring face of the defining face, if any. The flag invalid is set to one when the triangle strip of which the defining face is part has been already joined to another triangle strip. The integers smoothID and matID relate to two specific properties that a triangle can have: a smoothing group, and the material used to render the triangle, as can be appreciate by those of ordinary skill within the art. The index faceIndex is the number of the defining face in the face pool. Finally, the pointer *next points to the next defining face in the array.

In block 302, the next entry within the array is considered. In the case where block 302 is first reached, the next entry is the first entry in the array. If there are no more entries within the array—that is, if the last entry within the array has already been processed—then the method finished at block 302.

In block 304, it is determined whether the defining face of the current entry has any neighboring faces that are a part of another triangle strip (as opposed to the triangle strip of which the defining face of the current entry is a part). If there are no neighboring faces to the defining face of the current entry, then the method proceeds back to block 302 to obtain the next entry in the array.

Conversely, if there are any neighboring faces to the defining face of the current array, then in block 306 it is determined whether the defining face of the current entry has a neighboring face that is a defining face of another triangle strip (as opposed to the triangle strip of which the defining face of the current entry is a part)—that is, whether any of the neighboring faces are themselves defining faces of other triangle strips. In one embodiment, this is accomplished by determining whether any face in the index of neighboring faces is a face as pointed to by the pointer of any other entry in the array. If no neighboring faces to the defining face of the current entry are themselves defining faces, then the method proceeds back to block 302 to obtain the next entry in the array.

Conversely, if any of the neighboring faces to the defining face of the current are is a defining face of another triangle strip, then in block 308 it is determined whether the triangle strip of the defining face of the current entry can be joined with the triangle strip of the neighboring face to the defining face, which itself has been determined to be a defining face of a triangle strip. For purposes of clarity, the triangle strip of the defining face of the current entry is referred to as the first triangle strip, and the triangle strip of the neighboring face is referred to as the second triangle strip.

In one embodiment, the determination in block 308 is accomplished by determining whether the defining edge of the current entry is identical to the defining edge of the entry of the neighboring face in the second triangle strip. That is, it is determined whether the start edge, ending edge, or orphan edge of the current entry defines the same set of vertices as the start edge, ending edge, or orphan edge of the entry of the neighboring face. If they are, then the first strip and the second strip can be joined—that is, they are joinable, and the method proceeds to block 310 to join the strips.

However, if they are not identical, then it is determined whether there is any edge within the defining face of the current entry that is identical to the defining edge of the entry of the neighboring face in the second triangle strip. If there is not, then the strips cannot be joined, and the method proceeds back to block 302 to obtain the next entry in the array. If there is, conversely, then the strips are joinable, and the method proceeds to block 310 to join the strips.

Thus, in block 310, the first strip and the second strip are joined to create a new, larger strip in place of the first strip and the second strip. The strips are joined in one embodiment depending on whether the defining edge of the current entry was determined to be identical to the defining edge of the entry of the neighboring face from the second strip in block 308. If the edges were determined to be identical, then the two strips are joined by first modifying the ordering of one of the two strips. Each triangle strip has its faces defined starting in a clockwise ordering of the first face, and then each subsequent face has a reverse order (e.g., counter-clockwise) as compared to the previous face. Thus, when the two strips are joined, the face of each strip that will be joined to the other must have opposite orderings. Therefore, if they have the same orderings, the ordering of one of the two strips must be reversed (that is, the faces of one of the strips must be redefined as starting from clockwise to counter-clockwise, or vice-versa). Finally, the two strips are connected to one another to create the new, larger strip, by combining the two triangle strips, except that the two vertices defining the common edge between the two strips in one of the strips is dropped. For example, if a first strip ends with the vertices a, b, c, and the second strip starts with the vertices b, c, d, then the duplicate common vertices b and c are dropped from the final strip, which would include the vertices a, b, c, d at the joining of the two previous strips.

However, if the edges were determined not to be identical, then a slightly different process is performed to combine the two strips. First, the ordering of the two strips are compared again, and the ordering of one of the two strips is modified if it is determined that the orderings are identical, as has been described. Second, one to two dummy vertices are added to one of the two strips to create a dummy triangle, so that the defining edge of the other triangle strip (that is, the strip to which dummy vertices were not added) is equal to the edge resulting from the addition of the dummy vertex or vertices. Thus, for example, if a first strip ends with the vertices a, b, c, d, e, and the second strip starts with the vertices c, e, z, then one dummy vertex, c, is created and substituted for the vertex e in the first strip. The combined order looks like: a, b, c, d, c, e, z. Finally, the vertices of the two strips are combined into a new, larger strip. Once the two strips have been joined in block 310, then the method proceeds back to block 302 for processing the next entry in the array.

Figure 3B:
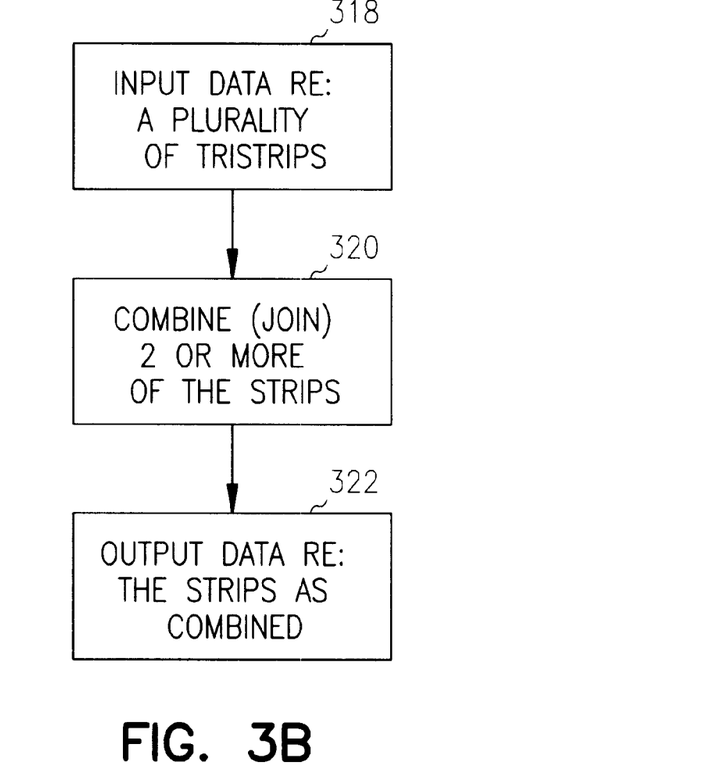
FIG. 3(b) shows a flowchart of another computer-implemented method according to an embodiment of the invention.

Referring next to FIG. 3(b), a flowchart of a method according to another embodiment of the invention is shown.

Like the method of FIG. 3(a), the computer-implemented method of FIG. 3(b) is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 318, data regarding a plurality of triangle strips is input. For example, the data can be received as entered by a user from an input device (such as a keyboard, etc.); the data can be received as read from a storage device (such as a hard disk drive or a removable media device); the data can be received through a network (such as over the Internet); etc. The invention is not so limited.

In block 320, it is attempted to combined two or more of the triangle strips. In one embodiment of the invention, the strips are attempted to be combined as has been described in conjunction with FIG. 3(a). However, the invention is not necessarily so limited.

Finally, in block 322, data regarding the triangle strips, as combined, are output. For example, the data can be displayed on a display device, such as a cathode ray tube (CRT) monitor or a flat panel display (FPD); the data can be saved to a storage device (such as a hard disk drive or a removable media device); the data can be sent through a network (such as over the Internet); etc. The invention is not so limited.

Figure 4:
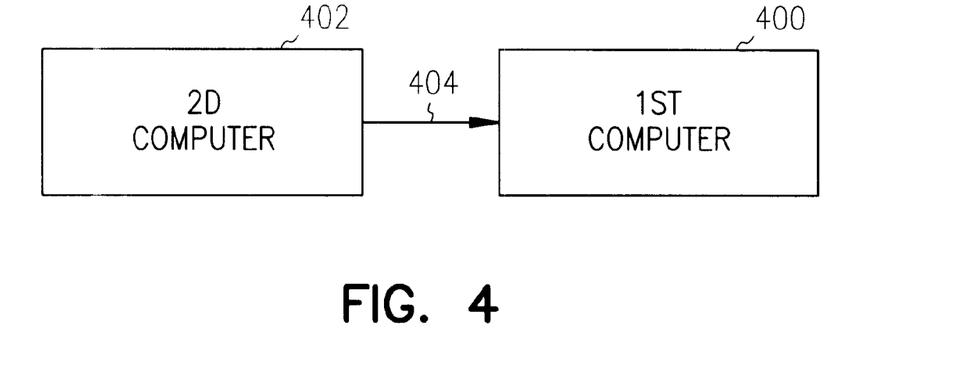
FIG. 4 shows a diagram of a computerized system according to an embodiment of the invention; and, FIG. 5 shows a diagram of a computer in conjunction with which embodiments of the invention may be practiced.

Referring next to FIG. 4, a diagram of a system in accordance with an embodiment of the invention is shown. The system of FIG. 4 can, for example, provide the manner by which the methods of FIGS. 3(a) and 3(b) are implemented. However, the invention is not so limited. The system of FIG. 4 includes two components: a first computer 400 and a second computer 402. The first computer 400 renders a plurality of triangle strips representing a triangle mesh of a three-dimensional object or model, where two or more of the strips have been already joined—that is, such that the model can be displayed on a display device, or otherwise output. The second computer joins two or more of the strips of the plurality of triangle strips. In one embodiment, the second computer accomplishes this as has been described in conjunction with FIG. 3(a); however, the invention is not necessarily so limited.

The arrow 404 of FIG. 4 represents the manner by which the triangle strips after two or more of them having been combined by the second computer 402 are output therefrom and input to the first computer 400 for rendering. For example, the second computer can save data representing the triangle strips to a removable storage media, such that the first computer loads the data therefrom; the second computer can send data representing the triangle strips over a network and the first computer can receive the data therefrom; etc. The invention is not so limited.

In one embodiment of the invention, the second computer includes a plug-in computer program, as known in the art, to generate a series of triangle strips from a triangle mesh representing a three-dimensional model or object, and then combining them in accordance with an embodiment of the invention. For example, the second computer may be running a graphics program that provides for the capability of adding plug-in computer programs. The invention is not so particularly limited, however.

Similarly, in one embodiment of the invention, the first computer includes a plug-in computer program, as known in the art, to render the triangle strips. For example, the first computer may be running a web browser program for navigating the Internet, that provides for the capability of adding plug-in computer programs. The invention is not so particularly limited, however.

Figure 5:
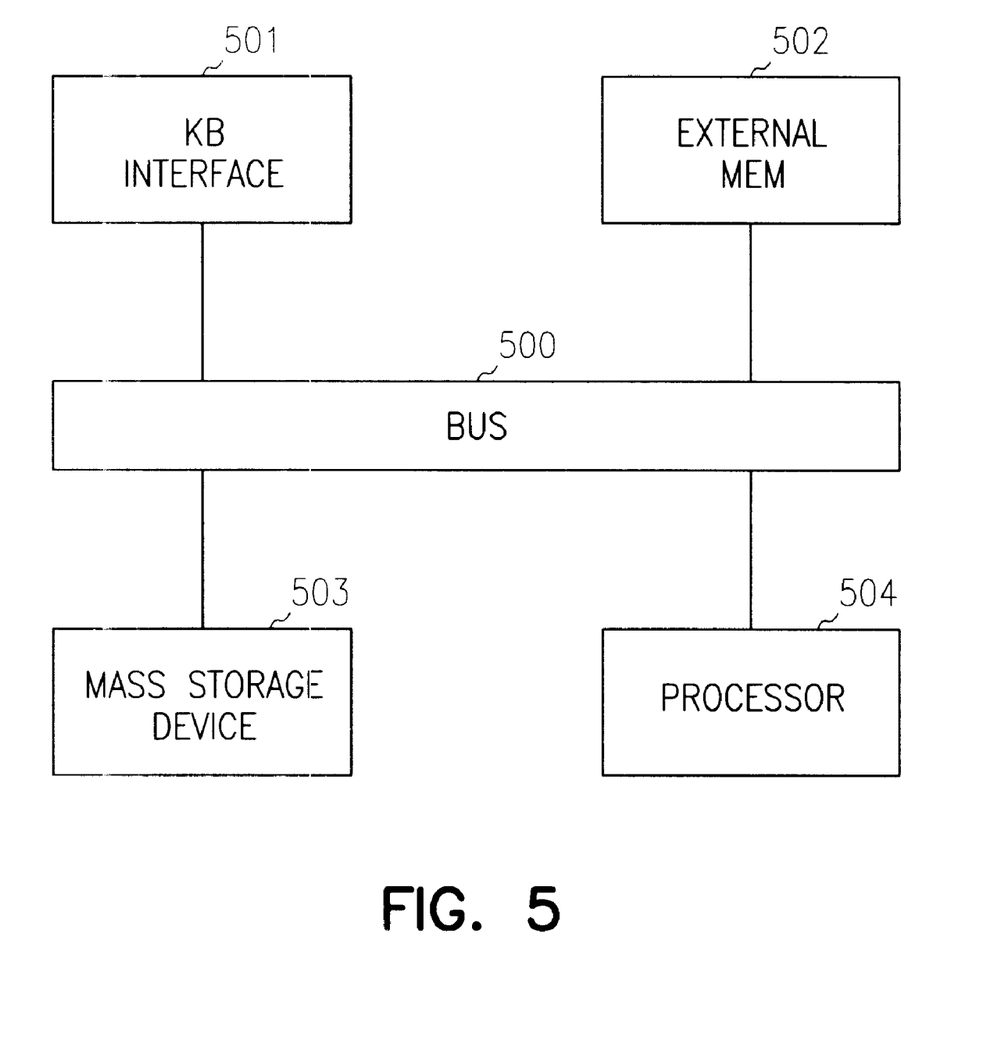

Referring finally to FIG. 5, a diagram of a computer in conjunction with which embodiments of the invention may be practiced is shown. For example, the computer of FIG. 5 can act as the first or the second computer as has been described in conjunction with FIG. 4. The computer comprises bus 500, keyboard interface 501, external memory 502, mass storage device 503 and processor 504. Bus 500 can be a single bus or a combination of multiple buses. Bus 500 can also comprise combinations of any buses. Bus 500 provides communication links between components in the computer. Keyboard controller 501 can be a dedicated device or can reside in another device such as a bus controller or other controller. Keyboard controller 501 allows coupling of a keyboard to the computer system and transmits signals from a keyboard to the computer system. External memory 502 can comprise a dynamic random access memory (DRAM) device, a static random access memory (SRAM) device, or other memory devices. External memory 502 stores information from mass storage device 503 and processor 504 for use by processor 504. Mass storage device 503 can be a hard disk drive, a floppy disk drive, a CD-ROM device, or a flash memory device. Mass storage device 504 provides information to external memory 502. Processor 504 can be a microprocessor and is capable of decoding and executing a computer program such as an application program or operating system with instructions from multiple instruction sets.

Triangle strip length maximization has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method comprising:

accessing data related to a plurality of triangle strips representing a triangle mesh used for representing a three dimensional image;

transforming the plurality of triangle strips to a second plurality of triangle strips based on the accessed data, wherein the transforming further comprises:

for each of the plurality of triangle strips representing a triangle mesh, determining whether a defining face of the strip has a neighboring face that is a defining face of another strip, where a defining face of a particular strip comprises one of a front face, an end face, and an orphan face of the particular strip;

upon determining that a defining face of the strip has a neighboring face that is a defining face of another strip, determining whether the strip and the another strip are joinable;

upon determining that the strip and the another strip are joinable, joining the strip and the another strip to create a new, larger strip in place of the strip and the another strip; and outputting data regarding the second plurality of triangle strips for subsequent representation of the three dimensional image, wherein the strip and the another strip are joinable if the defining face of the strip has a same index for the material used to render the defining face as the neighboring face of the another strip.

2. The computer-implemented method of claim 1, wherein determining whether the strip and the another strip are joinable comprises determining whether a defining edge of the defining face of the strip that has a neighboring face is equal to a defining edge of the defining face of the another strip equal to the neighboring face, where a defining edge of a particular defining face comprises one of a start edge, an ending edge, and an orphan edge.

3. The computer-implemented method of claim 2, wherein joining the strip and the another strip to create a new, larger strip comprises, upon determining that a defining edge of the defining face of the strip that has a neighboring face is equal to a defining edge of the defining face of the another strip equal to the neighboring face,
  determining whether an ordering of the strip is identical to an ordering of the another strip;
  upon determining that the ordering of the strip is identical to the ordering of the another strip,
    modifying the ordering of one of the strip and the another strip; and,
  connecting the strip and the another strip to create the new, larger strip.

4. The computer-implemented method of claim 2, wherein joining the strip and another strip to create a new, larger strip comprises, upon determining that a defining edge of the defining face of the strip that has a neighboring face is unequal to a defining edge of the defining face of the another strip equal to the neighboring face,
  determining whether an ordering of the strip is identical to an ordering of the another strip,
  upon determining that the order of the strip is identical to the ordering of the another strip,
    modifying the ordering of one of the strip and the another strip;
  adding one to two dummy vertices in one of the strip and the another strip to create a dummy triangle having an edge equal to the defining edge of the other of the strip and the another strip; and,
  connecting the strip and the another strip to create the new, larger strip.

5. The computer-implemented method of claim 1, further initially comprising generating an array having an entry for each defining face of each triangle strip, each entry in the array comprising:
  a pointer pointing to the face of the defining face;
  a type of defining face edge comprising one of a front face edge, an end face edge, and an orphan face edge;
  an index of neighboring faces for the defining face comprising each neighboring face to the defining face.

6. The computer-implemented method of claim 5, wherein determining whether a defining face of the strip has a neighboring face that is a defining face of another strip comprises, for each entry in the array, determining whether any face in the index of neighboring faces is a face as pointed to by the pointer of any other entry in the array.

7. The computer-implemented method of claim 1, further comprising:
  inputting data regarding the plurality of triangle strips; and,
  outputting data regarding the second plurality of triangle strips as at least two triangle strips of the plurality of triangle strips have been merged.

8. The computer-implemented method of claim 7, wherein inputting data is selected from the group essentially consisting of:
  receiving the data as entered by a user from an input device;
  receiving the data as read from a storage device; and,
  receiving the data through a network.

9. The computer-implemented method of claim 7, wherein outputting data is selected from the group essentially consisting of:
  displaying the data on a display device;
  saving the data to a storage device; and,
  sending the data through a network.

10. A computerized system comprising:
  a first computer to render a plurality of triangle strips as at least two triangle strips of the plurality of triangle strips have been joined; and,
  a second computer to join at least two triangle strips of the plurality of triangle steps according to a method comprising, for each triangle strip,
    determining whether a defining face of the strip has a neighboring face that is a defining face of another strip, where a defining face of a particular strip comprises one of a front face, an end face, and an orphan face of the particular strip;
    upon determining that a defining face of the strip has a neighboring face that is a defining face of another strip,
      determining whether the strip and the another strip are joinable;
      upon determining that the strip and the another strip are joinable,
        joining the strip and the another strip to create a new, larger strip in place of the strip and the another strip, wherein the strip and the another strip are joinable if the defining face of the strip has a same index for the material used to render the defining face as the neighboring face of the another strip.

11. The computerized system of claim 10, wherein the second computer further is to save data representing the plurality of triangle strips to a removable storage and the first computer further is to load the data from the removable storage.

12. The computerized system of claim 10, wherein the second computer further is to send data representing the plurality of triangle strips over a network and the first computer further is to receive the data over the network.

13. The computerized system of claim 10, wherein the second computer comprises a plug-in computer program to join at least two triangle strips of the plurality of triangle steps.

14. The computerized system of claim 10, wherein the first computer comprises a plug-in computer program to render the plurality of triangle strips.

15. A machine-readable medium having instructions stored thereon for execution by a processor to perform a method comprising:
  accessing data related to a plurality of triangle strips representing a triangle mesh used for representing a three dimensional image;
  transforming the plurality of triangle strips to a second plurality of triangle strips based on the accessed data, wherein the transforming further comprises:
    for each of a plurality of triangle strips representing a triangle mesh, determining whether a defining face of the strip has a neighboring face that is a defining face of another strip, where a defining face of a particular strip comprises one of a front face, an end face, and an orphan face of the particular strip;

upon determining that a defining face of the strip has a neighboring face that is a defining face of another strip, determining whether the strip and the another strip are joinable;

upon determining that the strip and the another strip are joinable, joining the strip and the another strip to create a new, larger strip in place of the strip and the another strip; and outputting data regarding the second plurality of triangle strips for subsequent representation of the three dimensional image, wherein the strip and the another strip are joinable if the defining face of the strip has a same index for the material used to render the defining face as the neighboring face of the another strip.

* * * * *

UNITED STATES PATENT AND TRADEMARK OFFICE
CERTIFICATE OF CORRECTION

PATENT NO. : 6,552,724 B1
DATED : April 22, 2003
INVENTOR(S) : Marshall

Page 1 of 1

It is certified that error appears in the above-identified patent and that said Letters Patent is hereby corrected as shown below:

<u>Title page,</u>
Item [56], References Cited, insert the following after U.S. PATENT DOCUMENTS:
-- OTHER PUBLICATIONS
Arkin, E.M., et al., "Hamiltonian Triangulations for Fast Rendering", Second Annual European Symposium on Algorithms, 855, Springer-Verlag Lecture Notes in Computer Science, pp. 1-77, (1994).

Evans, F., et al., "Efficiently Generating Triangle Strips for Fast Rendering", SIGGRAPH Presentation, pp. 1-25, (Dec. 1996).

Evans, F., et al., "Optimizing Triangle Strips for Fast Rendering", IEEE Visualization Presentation Seminar, San Francisco, CA, 8 p., (Oct. 27- Nov. 1, 1996). --.

Signed and Sealed this

First Day of June, 2004

JON W. DUDAS
*Acting Director of the United States Patent and Trademark Office*